United States Patent
Clark et al.

(10) Patent No.: US 10,725,741 B2
(45) Date of Patent: Jul. 28, 2020

(54) DIGITAL CIRCUIT WITH COMPRESSED CARRY

(71) Applicant: Groq, Inc., Menlo Park, CA (US)

(72) Inventors: Christopher Aaron Clark, Madison, WI (US); Jonathan Ross, Palo Alto, CA (US)

(73) Assignee: Groq, Inc., Mountain View, CA (US)

( * ) Notice: Subject to any disclaimer, the term of this patent is extended or adjusted under 35 U.S.C. 154(b) by 0 days.

(21) Appl. No.: 16/138,726

(22) Filed: Sep. 21, 2018

(65) Prior Publication Data

US 2020/0097253 A1    Mar. 26, 2020

(51) Int. Cl.
*G06F 7/544*  (2006.01)

(52) U.S. Cl.
CPC .................. *G06F 7/5443* (2013.01)

(58) Field of Classification Search
CPC ...................................... G06F 7/5443
USPC .................................. 708/620–632
See application file for complete search history.

(56) References Cited

U.S. PATENT DOCUMENTS

| | | | |
|---|---|---|---|
| 8,533,250 B1* | 9/2013 | Foo ....................... | G06F 7/5443 708/201 |
| 2013/0346463 A1* | 12/2013 | Hilker ...................... | G06F 7/52 708/620 |
| 2016/0342393 A1 | 11/2016 | Kossel | |

OTHER PUBLICATIONS

Danysh, A. et al., "Architecture and Implementation of a Vector/SIMD Multiply-Accumulate Unit," IEEE Transactions on Computers, vol. 54, No. 3, Mar. 2005, pp. 284-293.
Esposito, D. et al., "On the Use of Approximate Adders in Carry-Save Multiplier-Accumulators," 2017 IEEE International Symposium on Circuits and Systems, May 28, 2017, pp. 1-4.
Parhami, B., "Chapter 8.2. Carry-save adders; Chapter 8.3. Wallace and Dadda Trees," Computer Arithmetic: Algorithms and Hardware Designs, Jan. 1, 2000, pp. 128-133.
PCT International Search Report and Written Opinion, PCT Application No. PCT/US2019/051203, dated Dec. 5, 2019, 16 pages.

* cited by examiner

*Primary Examiner* — Tan V Mai

(74) *Attorney, Agent, or Firm* — Fenwick & West LLP

(57) ABSTRACT

Embodiments of the present disclosure pertain to digital circuits with compressed carries. In one embodiment, an adder circuit generates a sum and carry. The carry is compressed to reduce the number of bits required to represent the carry. In one embodiment, a multiplier circuit generates output product values. The output product values may be summed to produce a sum and carry. The carry may be compressed. In other embodiments, a multiplier circuit receives an input sum and compressed carry. The compressed input carry is decompressed and added to output product values and the input sum, and a resulting carry is compressed. The output of such a multiplier is another sum and compressed carry.

25 Claims, 5 Drawing Sheets

DIGITAL CIRCUIT WITH COMPRESSED CARRY

BACKGROUND

The present disclosure relates to digital circuits, and in particular, to digital circuits with compressed carry.

Digital circuits process logical signals represented by zeros (0) and ones (1) (i.e., bits). A digital multiplier is an electronic circuit capable of receiving two digital input values and determining a product of the two input values. Performing multiplication digitally can raise a number of challenges. For example, digital multipliers may comprise large arrays of adders and other circuits that can introduce delays in the various signals generated during the multiplication process and reduce the speed of the multiplication process. As another example, large numbers of interconnect wires may be required to route intermediate signals between various circuit components, which increases the area of the circuit and may cause processing delays if the wires run long distances, for example. As yet another example, numeric values in a digital system are represented by digital bits. When numbers represented by digital values are combined, errors relating to quantization and the limited accuracy of digital systems may occur, which can result in a loss of numeric accuracy, for example. In applications that require large numbers of accurate multiplications or additions, or both, these and other constraints may reduce the performance of the system.

One particular application where digital multiplication and/or addition are used extensively is machine learning (aka artificial intelligence). Such applications may require particularly fast, efficient, and/or accurate multipliers and/or adders to carry out various system functions.

The present disclosure provides improved architectures for digital circuits that process numeric values.

SUMMARY

Embodiments of the present disclosure pertain to digital circuits with compressed carry. In one embodiment, the present disclosure includes a digital circuit comprising one or more first adder circuits. The first adder circuits are configured to add at least one digital value to at least one other digital value to produce a plurality of first sum bits representing a first sum and a plurality of first carry bits representing a first carry. A compression circuit is configured to receive the first sum bits and first carry bits and produce a final sum and a compressed carry. The compression circuit includes a plurality of second adder circuits, wherein segments of a plurality of segments of the first sum bits are added to corresponding segments of a plurality of segments of the first carry bits to produce a plurality of values each comprising a segment of the final sum and a segment of the compressed carry.

In one embodiment, the at least one digital value is at least one output product value from a multiplier circuit. For example, one embodiment may comprise one or more first storage register circuits for storing digital bits corresponding to one or more first operands and one or more second storage register circuits for storing digital bits corresponding to one or more second operands. One or more multiplier circuits are configured to receive one or more of the first operands and one or more of the second operands and produce one or more corresponding output product values, which may be input to the first adder circuit as mentioned above.

In one embodiment, the at least one other value is another output product value from another multiplier circuit.

In one embodiment, the at least one other value comprises a plurality of second sum bits representing an input sum and a plurality of second carry bits representing an input carry, the digital circuit further comprising a decompression circuit configured to receive compressed input carry bits and produce the second carry bits representing the input carry, wherein the compressed input carry bits are zero padded to produce the second carry bits.

In one embodiment, each compressed input carry bit is zero padded so that the compressed input carry bits are aligned with predetermined bits in the second sum bits.

In one embodiment, the predetermined bits in the second sum bits are least significant bits in adjacent more significant segments.

In one embodiment, the one or more first adder circuits comprise a Wallace tree.

In one embodiment, the first sum bits and the first carry bits have an equal number of bits.

In one embodiment, the at least one output product value and at least one other value represent numeric values using the same format and the same number of bits.

In one embodiment, said same format is a fixed point representation of the output product value and the at least one other value.

In one embodiment, the plurality of segments of the first sum bits each have an equal number of bits, and wherein the number of bits in each segment of the first sum bits is equal to the number of bits in each segment of the first carry bits.

In one embodiment, each segment of the compressed carry comprises one bit.

In one embodiment, the first plurality of operands are values of an input activation vector and the second plurality of operands are values of a weight matrix.

In another embodiment, the present disclosure includes a digital circuit comprising a plurality of first storage register circuits for storing digital bits corresponding to a plurality of first operands, a plurality of second storage register circuits for storing digital bits corresponding to a plurality of second operands, and an array of multiplier units. Each multiplier unit comprises a plurality of multiplier circuits configured to receive a portion of the first operands and a portion of the second operands and produce a plurality of corresponding output product values, a plurality of first adder circuits, wherein the first adder circuits are configured to add a plurality of output product value to at least one other value to produce a plurality of first sum bits representing a first sum and a plurality of first carry bits representing a first carry, and a compression circuit configured to receive the first sum bits and first carry bits and produce a final sum and a compressed carry, the compression circuit comprising a plurality of second adder circuits, wherein segments of a plurality of segments of the first sum bits are added to corresponding segments of a plurality of segments of the first carry bits to produce a plurality of values each comprising a segment of the final sum and a segment of the compressed carry.

In another embodiment, the present disclosure includes a method comprising storing digital bits corresponding to one or more first operands in one or more first storage register circuits, storing digital bits corresponding to one or more second operands in one or more second storage register circuits, digitally multiplying, in one or more multiplier circuits, the one or more first operands and one or more second operands to produce one or more corresponding output product values, digitally adding, in one or more first adder circuits, at least one output product value to at least one other value to produce a plurality of first sum bits representing a first sum and a plurality of first carry bits representing a first carry, and compressing the first carry in a compression circuit configured to receive the first sum bits and first carry bits and produce a final sum and a compressed carry, said compressing the first carry comprising adding segments of a plurality of segments of the first sum bits to corresponding segments of a plurality of segments of the first carry bits to produce a plurality of values each comprising a segment of the final sum and a segment of the compressed carry.

In one embodiment, the at least one other value comprises a plurality of second sum bits representing an input sum and a plurality of second carry bits representing an input carry, the method further comprising decompressing compressed input carry bits into the second carry bits, said decompressing comprising receiving the compressed input carry bits and zero padding the compressed input carry bits to produce the second carry bits representing the input carry.

In another embodiment, the techniques described herein are incorporated in a hardware description language program, the hardware description language program comprising sets of instructions, which when executed produce a digital circuit. The hardware description language program may be stored on a non-transitory machine-readable medium, such as a computer memory (e.g., a data storage system).

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Features and advantages of the present disclosure include a digital circuit comprising multiplier and/or adder circuits using compressed carries to reduce the amount of data flowing through the system and improve system performance. In one embodiment, a multiplier circuit is configured to receive operands and produce an output product value. Adder circuits are configured to add an output product value to at least one other value to produce first sum bits representing a first sum and first carry bits representing a first carry. In one embodiment, the at least one other value is an input sum and input carry, where the input carry is received as a compressed input carry and decompressed before being added to the output of the multiplier. In another embodiment, the at least one other value is another multiplier output. In some embodiments, a plurality of multiplier outputs are added together and further added to a sum and decompressed carry, for example. The outputs of the adder circuits may be a sum and carry having substantially the same (or equal) numbers of bits. Features and advantages of the present disclosure include compressing the carry to have a fraction of the number of bits as the sum. The sum and compressed carry may be provided as input to another multiplier stage (and decompressed) or provided as an output, where a final combination (e.g., accumulation) of the sum and compressed carry may occur, for example.

Figure 1:
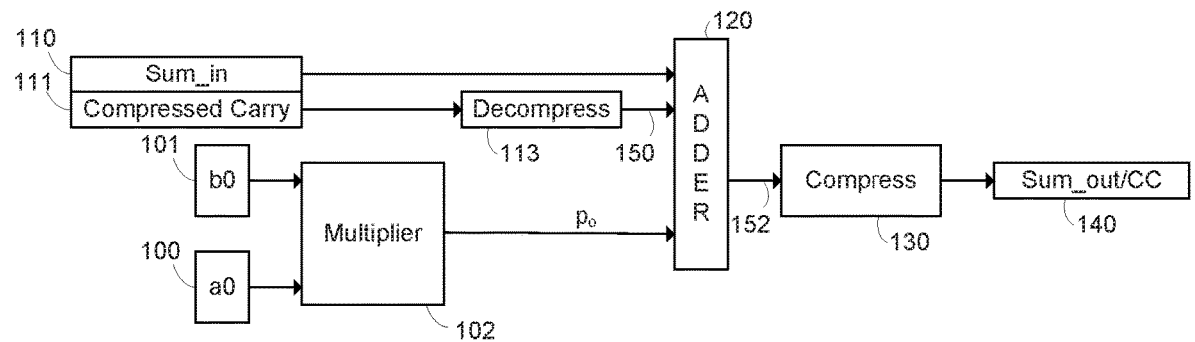
FIG. 1 illustrates a digital circuit with compressed carry according to one embodiment.

FIG. 1 illustrates a digital circuit with compressed carry according to one embodiment. In this illustrative example, a multiplier circuit 102 is coupled to storage register circuits 100 and 101. Storage register circuit 100 may store digital bits corresponding to a first operand, "a0," and storage register circuit 101 may store digital bits corresponding to a second operand, "b0." Multiplier circuit 102 is configured to receive operand "a0" and "b0" and produce an output product value, for example. An adder circuit 120 comprises a first input coupled to an output of multiplier circuit 102 to receive the output product value, "$p_o$." In this example, a second input of adder 120 is coupled to receive sum bits and carry bits. For instance, input sum bits 110 may represent an input sum and compressed input carry bits 111 correspond to a compressed carry. Input sum bits 110 may be coupled to one input of adder 120, and input compressed carry bits 111 may be decompressed at 113 and coupled to another input of adder 120, for example. Decompression 113 may be configured to receive compressed input carry bits and produce decompressed input carry bits at 150 that may be added to the input sum bits in adder 120, for example. In one embodiment, the compressed input carry bits 111 are zero padded to produce the carry bits at 150 representing an input carry at the input of adder 120 as described in more detail below.

Adder circuit 120 may comprise a plurality of individual adder circuits configured to add a plurality of inputs. The inputs may be values represented by a plurality of bits, for example. One example adder circuit 120 is a Wallace tree adder circuit, which is a multi-layered adder architecture for adding multiple digital values as in known by those skilled in the art. Adder circuits according to the present disclosure may be configured to add at least one output product value to at least one other value (here, a sum and carry) to produce a plurality of sum bits representing a sum (e.g., an output sum) and a plurality of carry bits representing a carry (e.g., an output carry) at 152.

Features and advantages of the present disclosure include a compression circuit 130 to compress the carry bits generated by adder block 120. Compression circuit 130 is configured to receive the sum bits and carry bits at 152 from adder 120 and produce a final sum and a compressed carry (CC) 140. The compression circuit 130 may also include a plurality of adder circuits, wherein segments of sum bits at 152 are added to corresponding segments of carry bits at 152 to produce a plurality of values each comprising a segment of the final sum and a segment of the compressed carry. An example of carry compression is illustrated in more detail below. In some embodiments, digital circuits such as the circuits shown in FIG. 1 may be configured on an integrated circuit as a unit (or block). Advantageously, using the techniques described herein, compressed carry bits may be passed between circuit blocks, which results in fewer interconnects (e.g., wires) between the circuit blocks, thereby saving area on the integrated circuit, for example.

Figure 2:
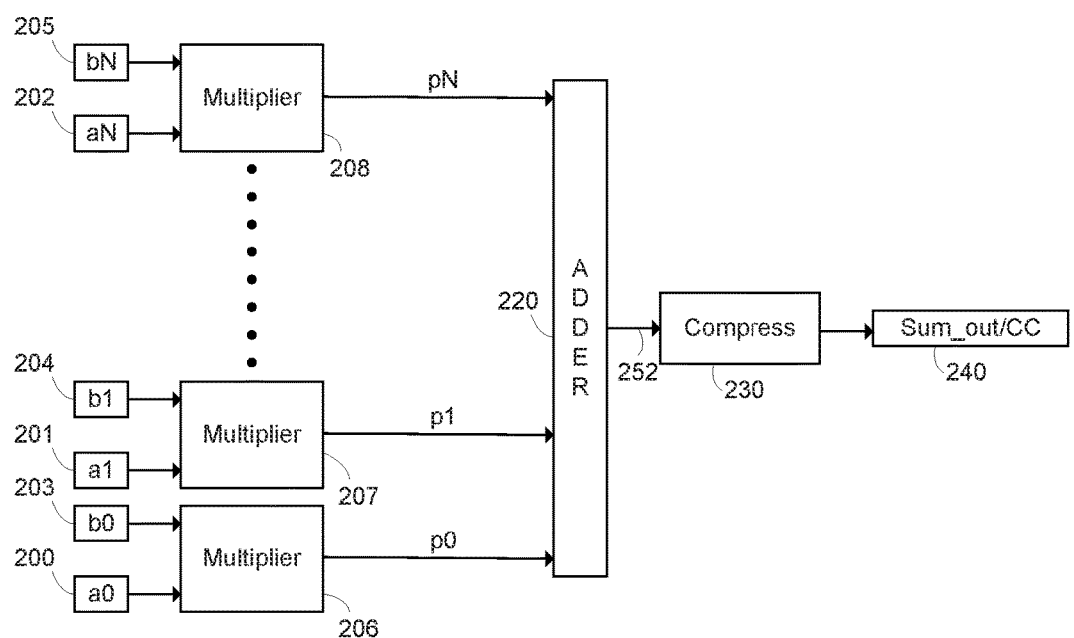
FIG. 2 illustrates a digital circuit with compressed carry according to another embodiment.

FIG. 2 illustrates a digital circuit with compressed carry according to another embodiment. In some embodiments, an output produce value from one multiplier circuit is added to one or more other output product values from other multiplier circuits, and the resulting carry is compressed. In this example, a plurality of storage register circuits 200-202 store digital bits corresponding to a first plurality of operands, a0-aN. A second plurality of storage register circuits 203-205 store digital bits corresponding to a second plurality of operands, b0-bN. In various embodiments, a0 . . . N and b0 . . . N may be elements of arrays or matrices, and multiplier circuits according to the present disclosure may be used to perform a dot product, for example. In this example, multipliers 206-208 each receive two operands and produce output product values, p0 . . . N. Adder circuit block 220 may comprise a plurality of adder circuits configured to add the output product values to produce a plurality of first sum bits representing a first sum and a plurality of first carry bits representing a first carry at 252. Similar to FIG. 1 above, a compression circuit 230 is configured to receive the first sum bits and first carry bits at 252 and produce a final sum and a compressed carry (CC) 240. Compression circuit 230 may also include a plurality of adder circuits, for example. As described using an example below, segments of the first sum bits at 252 are added to corresponding segments of the first carry bits at 252 to produce a plurality of values. Each of the values comprises a segment of the final sum and a segment of the compressed carry. In one embodiment, bits in the plurality of values within each segment correspond to the sum, and a bit in the plurality of values outside the segment corresponds to the compressed carry as illustrated by way of example below.

Figure 3:
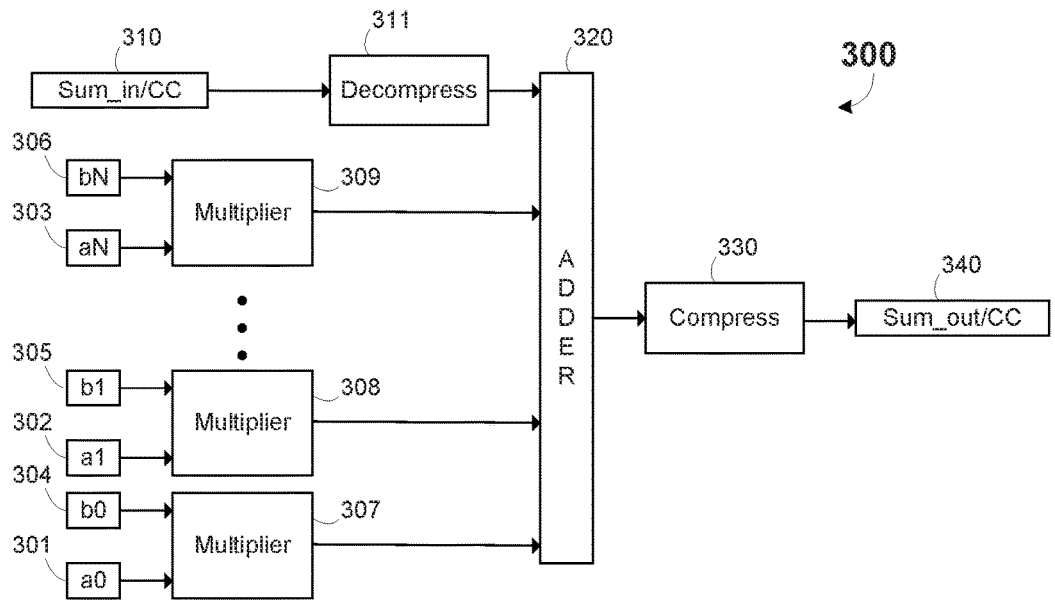
FIG. 3 illustrates a digital multiplier circuit with compressed carry according to yet another embodiment.

FIG. 3 illustrates a digital multiplier circuit with compressed carry according to another example embodiment. Features and advantages of the present disclosure include digital circuits that may be used to perform multiply-accumulate (e.g., multiply-add) operations. For example, embodiments of the present disclosure may include multiplier circuit cells (or blocks) 300 configured to perform a plurality of multiplications 307-309 on a plurality of operands a0 . . . aN and b0 . . . bN, where the products of each multiplication (e.g., a0b0, a1b1, . . . , aNbN) are summed. Advantageously, in some embodiments, a sum and compressed carry (CC) 310 result from other multiplication circuits (not shown) may be received and added with the products of the plurality of multiplier circuits 307-309, which advantageously allows multiply-accumulate operations to occur across many cells, where the data sent between the cells is reduced using compressed carries, for example. In this example, a plurality of first operands a0 . . . aN are stored in storage register circuits 301-303 and a plurality of second operands b0 . . . bN are stored in storage register circuits 304-306. Pairs of operands (aX, bX) are coupled to inputs of multiplier circuits 307-309 to produce a plurality of products (e.g., multiplier output values). The products from multipliers 307-309 are coupled to inputs of an adder circuit block 320. The input sum and compressed carry (CC) 310 are also coupled to the input of adder 320.

The compressed carry may be decompressed at 311 so adder 320 receives a sum, carry, and product bits representing numeric values using the same format (e.g., as N-bit fixed point representations of numbers).

A number of bits N used for the output of multipliers 307-309 and the sum and carry may be selected to represent any numeric value resulting from the product of any pair of input operands aX/bX (e.g., where aX and bX may be 16 bit floating point ("FP16") values such as IEEE 754 or 8 bit signed or unsigned integers ("Int8"/"uInt8")). The number of bits N may further be selected to cover a full dynamic range of an entire set of input operand values (e.g., FP16). In one example embodiment, N may equal 90-110 bits (e.g., 91 bits) for representing the products at the output of multipliers 307-309, the input sum, and decompressed carry, where the operands are received as FP16, Int8, or uInt8, for example. Accordingly, multipliers 307-309 may include circuitry for translating the format of the input, for example.

Adder 320 sums the output products from multipliers 307-309 and the input sum and decompressed carry to produce a new sum and carry, The new sum/carry is compressed at 330 and the resulting sum and compressed carry 340 may be forwarded to yet another multiplier circuit cell for another multiply accumulate operation, for example.

Figure 4:
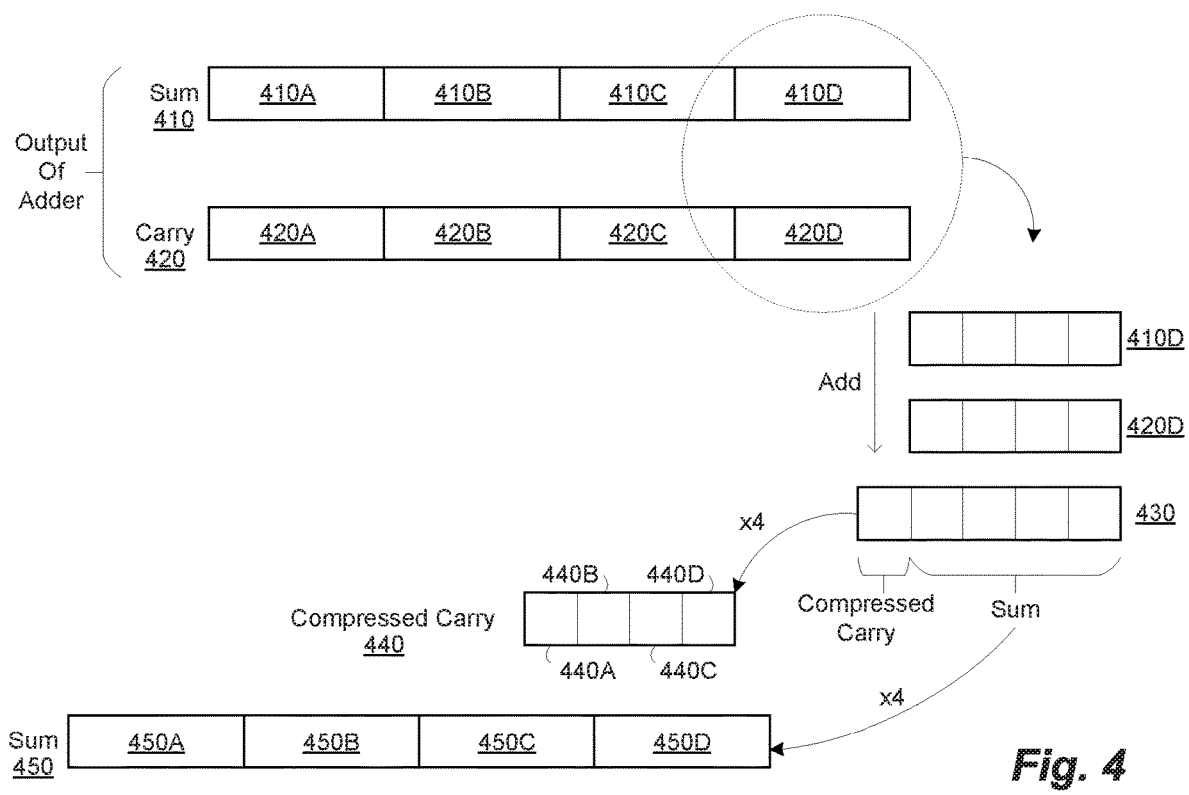
FIG. 4 illustrates carry compression according to one embodiment.

FIG. 4 illustrates carry compression according to one embodiment. For example, a plurality of adder circuits may be used to sum output products from one or multipliers and a sum and carry received from a previous multiplier circuit. The output of a composite adder may include a new sum 410 and carry 420, which may represent numeric values using the same number of bits, for example. In one embodiment, the sum bits and carry bits are divided into segments, as illustrated by segments 410A-D for the sum and segments 420A-D for the carry. Compression may include adding each segment of sum bits to corresponding segments of the carry bits as illustrated for segments 410D and 420D. The result of adding each segment is a new value 430 comprising a final sum 450 and compressed carry 440. For example, the final sum is taken as the bits of the new value 430 within the segment (illustrated by the "Sum" brackets). In this example, segment 410D and segment 420D each include 4 bits. Thus, final sum value comprises the 4 bits from the new value 430, which are within the segment. The compressed carry is taken as the bit of the new value 430 outside the segment (illustrated by the "Compressed Carry" bracket), which is in the next bit position above the most significant bit of the segment (e.g., here, the 5th bit position). Accordingly, the addition of each segment of the sum 410 and carry 420 results in a component of the final sum 450A-D and a component of the compressed carry 440A-D. The compressed carry components 440A-D produced from each segment may be combined to form the compressed carry 440 and final sum components 450A-D produced from each segment may be combined to form the final sum 450.

Figure 5:
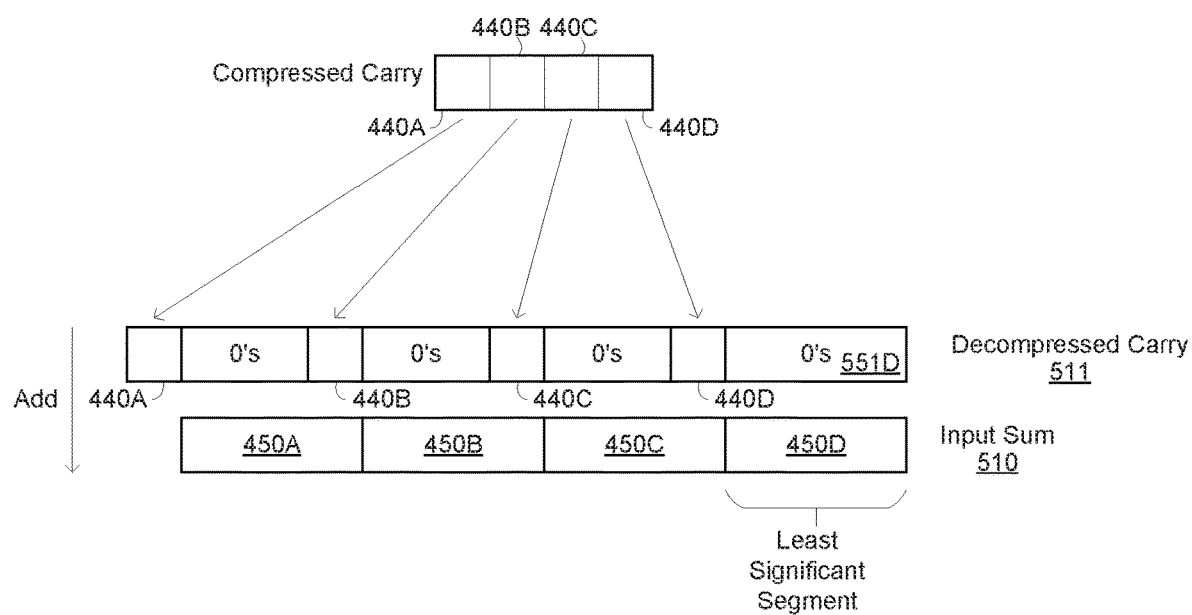
FIG. 5 illustrates carry decompression according to one embodiment.

FIG. 5 illustrates carry decompression according to one embodiment. Another advantage of one example embodiment is that decompression of the compressed carry may be achieved with zero padding. As illustrated in FIG. 5, decompression may comprise inserting zero values between the compressed carry bits 440A-D, which may be very fast and require little circuitry to implement. In one embodiment, each compressed input carry bit is zero padded so that the compressed input carry bits are aligned with predetermined bits in the second sum bits. In some embodiments, the predetermined bits in the second sum bits are least significant bits in adjacent more significant segments. In this example, one segment 551D of the decompressed carry in the least significant segment position is completely zero padded, and the other segments 440A-C are zero padded with the carry bit in the least significant bit (LSB) position in each segment. Thus, the compressed carry bit in this example is aligned with the LSB of the adjacent more significant segment (i.e., the next segment moving from the LSB to the MSB. The compressed carry bit in the most significant position, 440D, is placed at the end in the most significant bit (MSB) position of the compressed carry, for example. With this configuration, the zero padded carry may be used as an input carry 511 and added to the input sum 510 as well as one or more products from one or more multipliers, for example.

Figure 6:
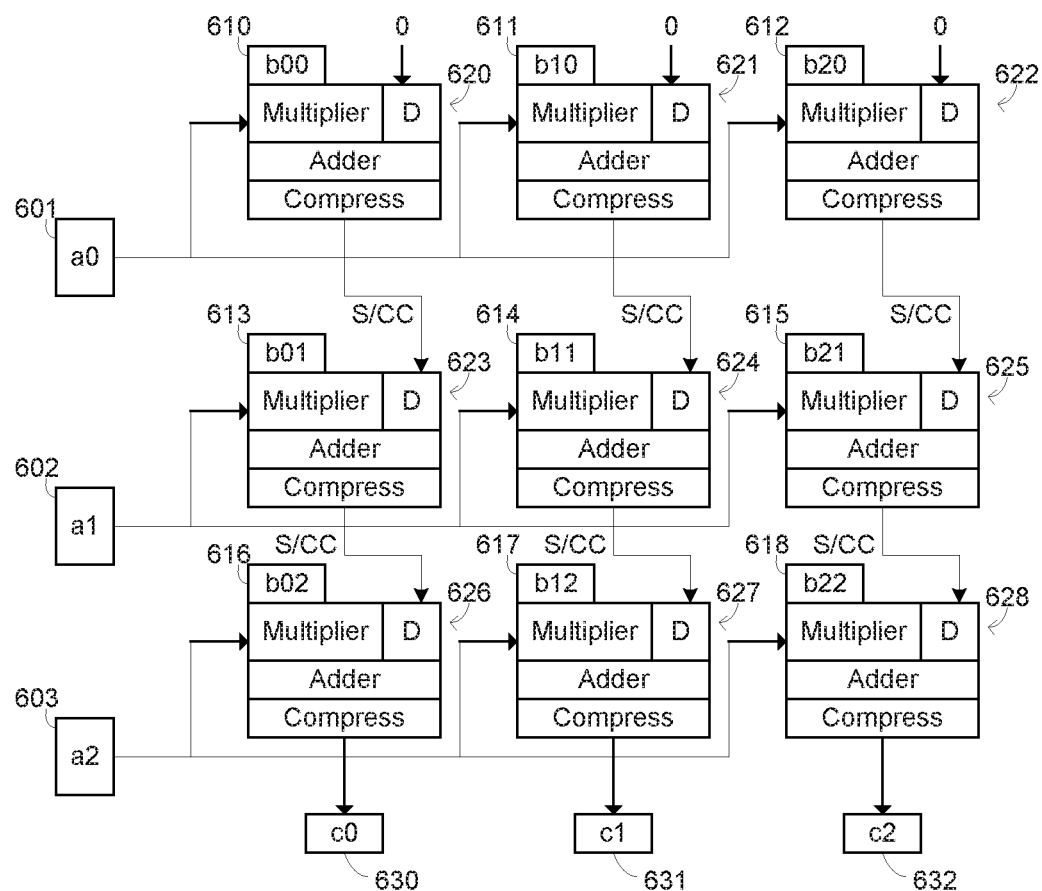
FIG. 6 illustrates a digital multiplier with carry compression configured to perform a dot product according to one embodiment.

FIG. 6 illustrates a digital multiply-accumulator with carry compression configured to perform dot products according to one embodiment. In this example, operands aX may be activations of a machine learning algorithm (e.g., activation inputs of a neural network) and operands bX may be weights of the algorithm. A dot product of an input activation vector, A, with a matrix of weights, B, may be performed as follows:

A×B=C, where A is a vector with N elements, B is an N×N matrix, and C is an output vector with N elements.

$$\begin{bmatrix} b00 & b01 & b02 \\ b10 & b11 & b12 \\ b20 & b21 & b22 \end{bmatrix} \begin{bmatrix} a0 \\ a1 \\ a2 \end{bmatrix} = \begin{bmatrix} c1 \\ c2 \\ c3 \end{bmatrix} = \begin{bmatrix} a0b00 + a1b01 + a2b02 \\ a0b10 + a1b11 + a2b12 \\ a0b20 + a1b21 + a2b22 \end{bmatrix}$$

Accordingly, in this example, values for a0, a1, a2 are provided as inputs from registers 601-603 to an array of multiplier units 620-628 with registers 610-618 storing weight values b00 . . . b22. In this example, multiplier units 620-628 are coupled together in columns and the results accumulated, such that the output values c0, c1, c2 are accumulated at the bottom of each column in registers 630-632 to produce the accumulated results of the products shown above. While the present example shows an N=3 product, it is to be understood that much larger vectors and matrices may be combined using the techniques described herein to reduce the number of interconnects (e.g., wires) used to pass sums and carries between large arrays of multipliers and/or adders (or both) to improve the speed and reduce the area of an integrated circuit, for example.

In this example, each multiplier receives an activation aX, weight bX, and sum and compressed carry ("S/CC"). Multiplier units 620-622 configured at the top of the array may receive zero values for S/CC, for example, as illustrated by "0s" into decompression circuits, denoted D in each unit. As illustrated above, other embodiments may combine a plurality of multipliers in each multiplier unit. The products of one or more multipliers and the values of the decompressed sum and carry are summed in an adder as described above. The adder result is compressed, as described above, and sent as a sum and compressed carry (S/CC) input to the next multiplier unit. Arrays of such multiplier unit configurations may perform dot products on larger arrays on a wide range of inputs. In one embodiment, the weights are loaded and the activations, a0 . . . aN, are streamed into the array to produce a stream of results, c0 . . . cN, for example, which may be stored in a memory system (not shown).

Figure 7:
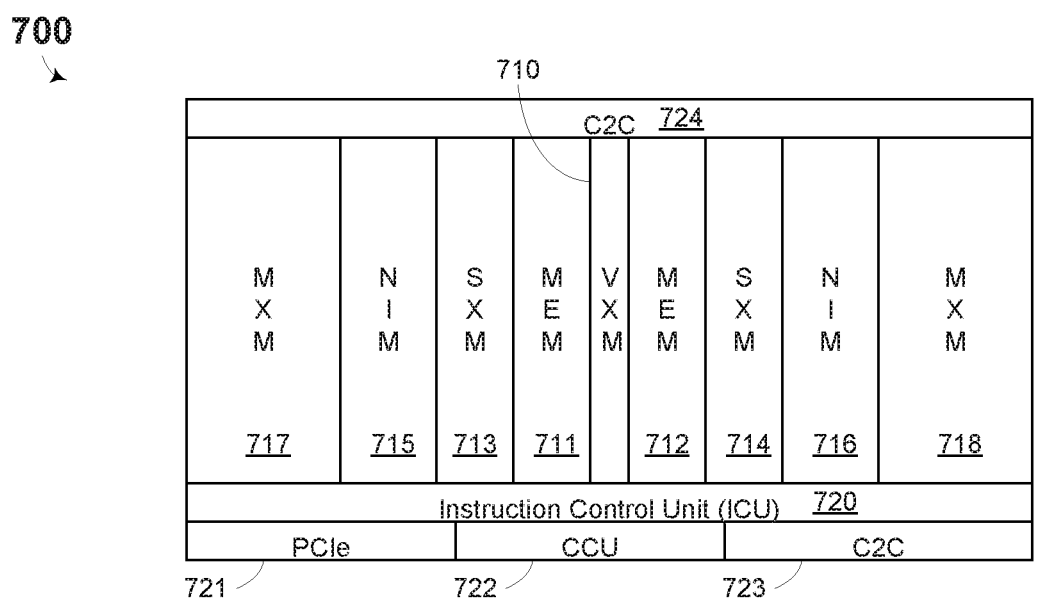
FIG. 7 illustrates an example machine learning processor according to one embodiment.

FIG. 7 illustrates an example machine learning processor according to one embodiment. Machine learning processor 700 (aka, Artificial Intelligence (AI) processor) may include memory and arithmetic units optimized for multiplying and adding input data with weight sets (e.g., trained or being trained) for machine learning applications (e.g., training or inference). For example, machine learning processor 700 includes a vector processor (VxM) 710 for performing operations on vectors (i.e., one-dimensional arrays of values). In this example, other elements of the system are arranged symmetrically on either side of the VxM 710 to optimize processing speed. For example, VxM 710 is adjacent to memories 711 and 712, switch matrices (SxM) 713 and 714 to control routing of data, data format and presentation controllers (NIM) 715 and 716, and a matrix multiplication unit (MxM) 717 and 718. MxMs 717 and 718 may include circuits as described herein for example. An instruction control unit (ICU) 720 controls the flow of data and execution of operations across blocks 710-718, for example. Machine learning processor 700 includes communications circuits such as chip-to-chip (C2C) circuits 723-724 (e.g., for parallel operation of multiple processors 700) and an external communication circuit (e.g., PCIe) 721 (e.g., for communication with other computer systems, such as one or more servers). Processor 700 may further include a chip control unit (CCU) 722 to control boot operations, clock resets, and other low level setup operations, for example.

The above specification provides illustrative and example descriptions of various embodiments. While the present disclosure illustrates various techniques and embodiments as implemented physical circuitry (e.g., on an integrated circuit), it is to be understood that such techniques and innovations may also be embodied in a hardware description language program such as VHDL or Verilog as is understood by those skilled in the art. A hardware description language (HDL) is a specialized computer language used to describe the structure and behavior of electronic circuits, and most commonly, digital logic circuits. A hardware description language enables a precise, formal description of an electronic circuit that allows for the automated analysis and simulation of an electronic circuit. It also allows for the synthesis of an HDL description into a netlist (a specification of physical electronic components and how they are connected together), which can then be placed and routed to produce the set of masks used to create an integrated circuit.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A digital circuit comprising:
   one or more first storage register circuits for storing digital bits corresponding to one or more first operands;
   one or more second storage register circuits for storing digital bits corresponding to one or more second operands;
   one or more multiplier circuits configured to receive one or more of the first operands and one or more of the second operands and produce one or more corresponding output product values;
   one or more first adder circuits, wherein each of the one or more first adder circuits is configured to add at least one output product value to another value to produce a plurality of first sum bits representing a first sum and a plurality of first carry bits representing a first carry; and a compression circuit configured to receive the first sum bits and first carry bits and produce a final sum and a compressed carry, the compression circuit comprising a plurality of second adder circuits, wherein segments of a plurality of segments of the first sum bits are added to corresponding segments of a plurality of segments of the first carry bits to produce a plurality of values each comprising a segment of the final sum and a segment of the compressed carry.

2. The digital circuit of claim 1 wherein the at least one other value is another output product value from another multiplier circuit.

3. The digital circuit of claim 1 wherein the at least one other value comprises a plurality of second sum bits representing an input sum and a plurality of second carry bits representing an input carry, the digital circuit further comprising a decompression circuit configured to receive compressed input carry bits and produce the second carry bits representing the input carry, wherein the compressed input carry bits are zero padded to produce the second carry bits.

4. The digital circuit of claim 3 wherein each compressed input carry bit is zero padded so that the compressed input carry bits are aligned with predetermined bits in the second sum bits.

5. The digital circuit of claim 4 wherein the predetermined bits in the second sum bits are least significant bits in adjacent more significant segments.

6. The digital circuit of claim 1 wherein the one or more first adder circuits comprise a Wallace tree.

7. The digital circuit of claim 1 wherein the first sum bits and the first carry bits have an equal number of bits.

8. The digital circuit of claim 1 wherein the at least one output product value and at least one other value represent numeric values using the same format and the same number of bits.

9. The digital circuit of claim 8 wherein said same format is a fixed point representation of the output product value and the at least one other value.

10. The digital circuit of claim 1 wherein the plurality of segments of the first sum bits each have an equal number of bits, and wherein the number of bits in each segment of the first sum bits is equal to the number of bits in each segment of the first carry bits.

11. The digital circuit of claim 1 wherein each segment of the compressed carry comprises one bit.

12. The digital circuit of claim 1 wherein the first plurality of operands are values of an input activation vector and the second plurality of operands are values of a weight matrix.

13. A digital circuit comprising:
a plurality of first storage register circuits for storing digital bits corresponding to a plurality of first operands;
a plurality of second storage register circuits for storing digital bits corresponding to a plurality of second operands; and
an array of multiplier units each comprising:
a plurality of multiplier circuits configured to receive a portion of the first operands and a portion of the second operands and produce a plurality of corresponding output product values;
a plurality of first adder circuits, wherein each of the one or more first adder circuits is configured to add a plurality of output product value to another value to produce a plurality of first sum bits representing a first sum and a plurality of first carry bits representing a first carry; and
a compression circuit configured to receive the first sum bits and first carry bits and produce a final sum and a compressed carry, the compression circuit comprising a plurality of second adder circuits, wherein segments of a plurality of segments of the first sum bits are added to corresponding segments of a plurality of segments of the first carry bits to produce a plurality of values each comprising a segment of the final sum and a segment of the compressed carry.

14. The digital circuit of claim 13 wherein the at least one other value is another output product value from another multiplier circuit.

15. The digital circuit of claim 13 wherein the at least one other value comprises a plurality of second sum bits representing an input sum and a plurality of second carry bits representing an input carry, the digital circuit further comprising a decompression circuit configured to receive compressed input carry bits and produce the second carry bits representing the input carry, wherein the compressed input carry bits are zero padded to produce the second carry bits.

16. The digital circuit of claim 13 wherein the one or more adders comprise a Wallace tree.

17. The digital circuit of claim 13 wherein the first sum bits and the first carry bits have an equal number of bits.

18. The digital circuit of claim 13 wherein the at least one output product value and at least one other value represent numeric values using the same format and the same number of bits.

19. The digital circuit of claim 13 wherein the plurality of segments of the first sum bits each have an equal number of bits, and wherein the number of bits in each segment of the first sum bits is equal to the number of bits in each segment of the first carry bits.

20. The digital circuit of claim 13 wherein each segment of the compressed carry comprises one bit.

21. The digital circuit of claim 13 wherein the first plurality of operands are values of an input activation vector and the second plurality of operands are values of a weight matrix.

22. A method comprising:
storing digital bits corresponding to one or more first operands in one or more first storage register circuits;
storing digital bits corresponding to one or more second operands in one or more second storage register circuits;
digitally multiplying, in one or more multiplier circuits, the one or more first operands and one or more second operands to produce one or more corresponding output product values;
digitally adding, in each of one or more first adder circuits, at least one output product value to another value to produce a plurality of first sum bits representing a first sum and a plurality of first carry bits representing a first carry; and
compressing the first carry in a compression circuit configured to receive the first sum bits and first carry bits and produce a final sum and a compressed carry, said compressing the first carry comprising adding segments of a plurality of segments of the first sum bits to corresponding segments of a plurality of segments of the first carry bits to produce a plurality of values each comprising a segment of the final sum and a segment of the compressed carry.

23. The method of claim 22 wherein the at least one other value comprises a plurality of second sum bits representing an input sum and a plurality of second carry bits representing an input carry, the method further comprising decompressing compressed input carry bits into the second carry bits, said decompressing comprising:

receiving the compressed input carry bits; and zero padding the compressed input carry bits to produce the second carry bits representing the input carry.

24. A non-transitory machine-readable medium storing a hardware description language program, the hardware description language program comprising sets of instructions, which when executed by a processor produce a digital circuit comprising:

one or more first storage register circuits for storing digital bits corresponding to one or more first operands;

one or more second storage register circuits for storing digital bits corresponding to one or more second operands;

one or more multiplier circuits configured to receive one or more of the first operands and one or more of the second operands and produce one or more corresponding output product values;

one or more first adder circuits, wherein each of the one or more first adder circuits is configured to add at least one output product value to another value to produce a plurality of first sum bits representing a first sum and a plurality of first carry bits representing a first carry; and a compression circuit configured to receive the first sum bits and first carry bits and produce a final sum and a compressed carry, the compression circuit comprising a plurality of second adder circuits, wherein segments of a plurality of segments of the first sum bits are added to corresponding segments of a plurality of segments of the first carry bits to produce a plurality of values each comprising a segment of the final sum and a segment of the compressed carry.

25. A digital circuit comprising:

one or more first adder circuits, wherein each of the one or more first adder circuits is configured to add at least one first digital value to another digital value to produce a plurality of first sum bits representing a first sum and a plurality of first carry bits representing a first carry; and a compression circuit configured to receive the first sum bits and first carry bits and produce a final sum and a compressed carry, the compression circuit comprising a plurality of second adder circuits, wherein segments of a plurality of segments of the first sum bits are added to corresponding segments of a plurality of segments of the first carry bits to produce a plurality of values each comprising a segment of the final sum and a segment of the compressed carry.

* * * * *